US005913644A

United States Patent [19]
DeRoche et al.

[11] Patent Number: 5,913,644
[45] Date of Patent: Jun. 22, 1999

[54] HELICAL MILL HAVING MULTIPLE FLUTES WITH DIFFERING RAKE ANGLES

[75] Inventors: Kenneth G. DeRoche, Greensburg, Pa.; Mark A. Francis, Solon, Ohio

[73] Assignee: Kennametal Inc., Latrobe, Pa.

[21] Appl. No.: 09/062,843

[22] Filed: Apr. 20, 1998

[51] Int. Cl.[6] ..................................................... B23C 5/20
[52] U.S. Cl. ............................... 407/42; 407/54; 407/59; 407/63
[58] Field of Search ................................. 407/42, 43, 53, 407/54, 58, 59, 63

[56] References Cited

U.S. PATENT DOCUMENTS

| 4,182,587 | 1/1980 | Striegl | 407/59 X |
|---|---|---|---|
| 4,714,383 | 12/1987 | Shimomura et al. | 407/42 |
| 4,844,666 | 7/1989 | Tsujimura et al. | 407/59 X |
| 5,083,887 | 1/1992 | Dotany | 407/59 |
| 5,425,603 | 6/1995 | Dutschke et al. | 407/59 X |

*Primary Examiner*—Andrea L. Pitts
*Assistant Examiner*—Henry W. H. Tsai
*Attorney, Agent, or Firm*—John J. Prizzi; John M. Vasuta

[57] ABSTRACT

A multiple fluted helical end mill with at least two flutes. Each flute includes a plurality of inserts secured therein. The inserts are all identical. The inserts in different flutes being secured therein at different rake angles. The different rake angles resulting in different effective axial lengths of the inserts. This different effective length of inserts in adjacent flutes results in all effective cutting and it is particularly beneficial where the inserts in a given flute do not have overlapping cutting edges.

15 Claims, 4 Drawing Sheets

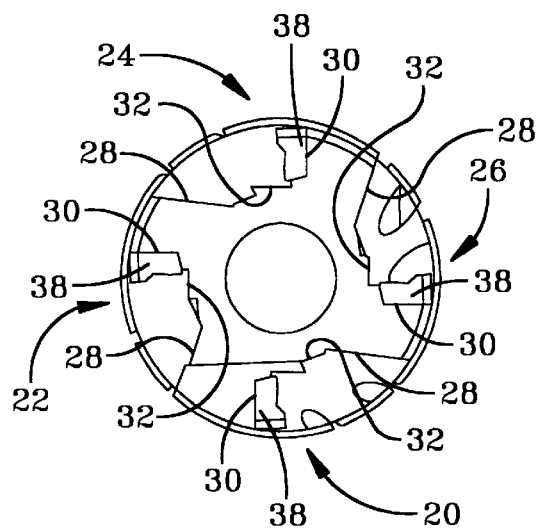
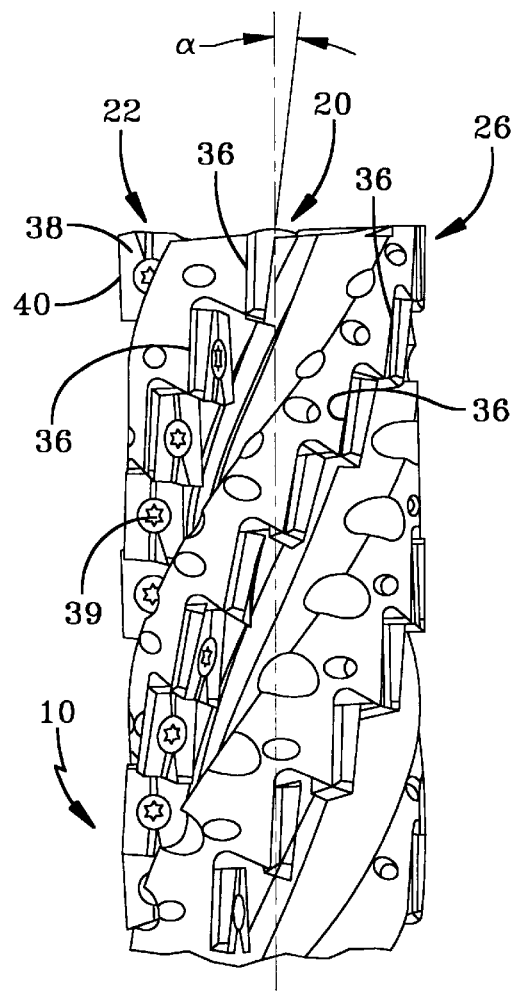
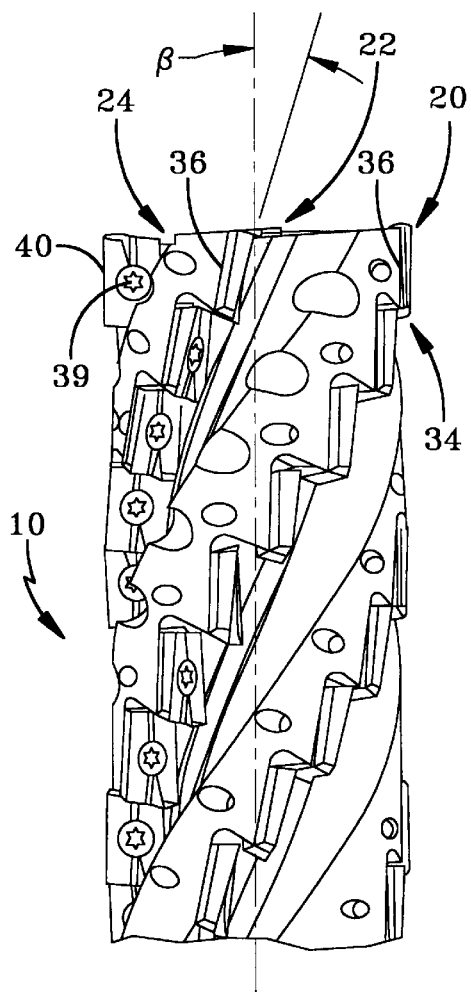
FIG-2
FIG-3
FIG-4

HELICAL MILL HAVING MULTIPLE FLUTES WITH DIFFERING RAKE ANGLES

FIELD OF THE INVENTION

The present invention relates generally to metalcutting tools and more particularly to helical cutting tools such as end mills and face mills. Specifically, the present invention relates to multiple fluted helical end mills where the inserts in at least one of the flutes are at a different rake angle than the inserts in the other flutes.

BACKGROUND OF THE INVENTION

Helical end mills and face mills are well known in the industry. Conventional helical end mills include those shown on pages 182–216 in Kennametal's Milling Catalog No. 5040, copyright 1995.

One form of helical mill that has been in use for years is a helical mill where the cutting edge of each insert is axially spaced apart from the cutting edge of the next adjacent insert and where the inserts in each helix are staggered such that two or more rows are necessary to produce one complete or "all effective" cutting edge. Such a design is shown by the Kennametal 0° Lead—Helical End Mills, as shown on page 188 of the above referenced Milling Catalog. One of the disadvantages of such design is that the lead insert in at least one helix must either be of a different length or offset inward and thus incapable of face milling. This is a result of the need to stagger the inserts in each helix. As a result, all of the inserts are generally not the same and thus not interchangeable, thus requiring the manufacture and inventory of multiple inserts.

These staggered helix and other conventional mills are sufficient for their intended purposes and thus many cutting processes; however, it is desirable to eliminate the need for differing inserts on a given mill.

One such solution is described in U.S. Pat. No. 5,083,887. In this solution, the cutting inserts are disposed in a helical array in which the cutting edge of each insert, with respect to the cutting tool, is spaced in the circumferential direction from the seat of the next adjacent insert and is in overlapping relationship in the axial direction with the cutting edge of the next adjacent insert, and the radially extending edges of each insert are in overlapping relation with the radially extending edges of the adjacent inserts, such that the cutting edge of all of the inserts in any one flute define a continuous, non-interrupted, cutting line of stepped configuration. This solution has become known as single flute "all-effective" milling.

Although this single flute "all effective" mill provides a helical end mill using only one type of insert and needing only one flute for "all effective" cutting, the industry continues to strive for improved "all effective" milling whether it be single flute or double flute "all effective". In particular the industry continues to strive for even better surface finishing, smoother cutting action, reduced vibrations, reduced hammering, reduced chattering, more economical cutters, more durable cutters, longer lasting cutters, and more simplistic designs for easier and faster manufacture and insert replacement.

SUMMARY AND OBJECTS OF THE INVENTION

Accordingly, it is an object of the present invention to provide an improved helical mill, such as an end mill or face mill.

It is a further objective of the present invention to provide such an improved helical mill which provides for "all effective" cutting.

It is a further objective of the present invention to provide such "all effective" cutting using identical inserts on the entire mill.

It is a further objective of the present invention to provide such an improved helical mill which includes non-uniform flutes and/or insert seats on the flutes including differing rake angles.

It is a further objective of the present invention to provide a helical mill having identical inserts along each flute wherein the inserts in given flutes are seated at different axial rake angles and thus the inserts in multiple flutes provide for "all effective" cutting.

It is a further objective of the present invention to provide a helical mill having identical inserts along each flute wherein the inserts are mounted such that the inserts in different flutes have differing axial lengths and thus the inserts in multiple flutes provide for "all effective" cutting.

It is further an objective of the present invention to provide some or all of the following in comparison to the current mills: better surface finishing, smoother cutting action, reduced vibrations, reduced hammering, reduced chattering, more economical cutters, more durable cutters, longer lasting cutters, less horsepower consumption during cutting, and more simplistic designs for easier and faster manufacture and insert replacement.

Still other objectives and advantages are achieved by the present invention, many of which may be apparent from a reading of the following summary of the invention and detailed description subsequent thereto.

The present invention is a helical mill having multiple flutes with differing rake angles.

BRIEF DESCRIPTION OF THE DRAWINGS

FIG. 2 is an end view of the helical end mill.

FIG. 3 is a fragmentary side view of the cutting portion of the helical end mill taken looking directly at the lead insert in a first flute and displaying the axial rake angle of the first flute.

FIG. 4 is a second fragmentary side view of the cutting portion of the helical end mill taken looking directly at the lead insert in a second flute and displaying the differing axial rake angle of the second flute in comparison to the first flute, whereby the differing axial rake angles between flutes results in differing effective axial lengths of the inserts and thus different effective cutting lengths of the inserts, which is responsible for "all effective" cutting.

DETAILED DESCRIPTION OF THE INVENTION

Figure 1:
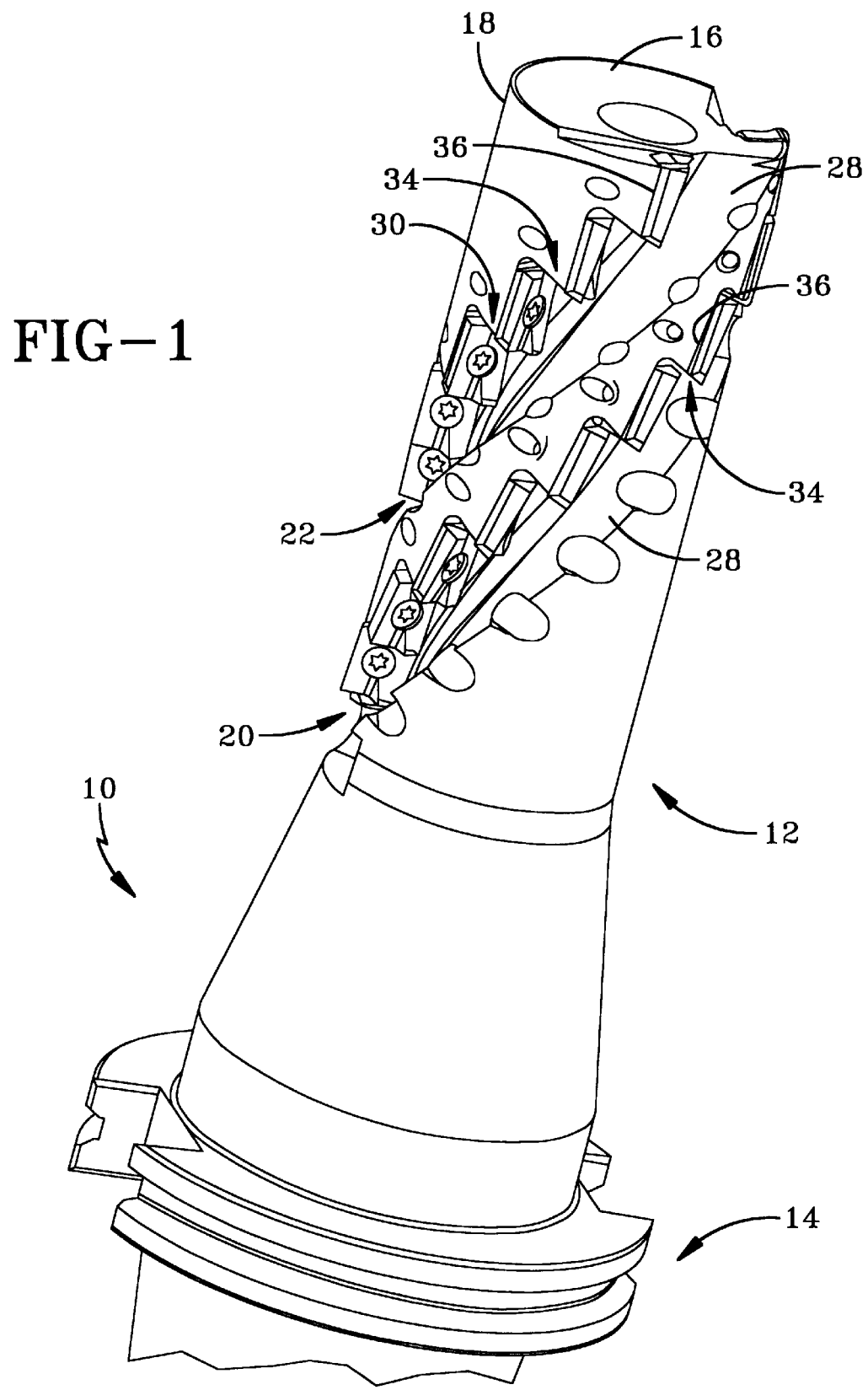
FIG. 1 is an isometric view of the present invention of a helical end mill with multiple flutes having inserts seated therein where inserts in adjacent flutes are at differing axial rake angles.

Referring to FIG. 1, the invention is a helical cutting tool, such as an end mill, face mill, or any other known mill. One embodiment of this invention is shown in the figures as a helical end mill 10 although the inventive concept is applicable to any cutting tool that the concept of differing rake angles may be applied upon as described below in more detail. The displayed helical end mill 10 includes a tool body 12 and a shank 14. The shank 14 is configured so as to be capable of insertion and securing within the spindle of a milling or other cutting machine (not shown) as is well known in the art. The shank 14 may be of any shape or design so as to be capable of this insertion and securing. Such designs include but are not limited to V-flange, taper, shell mill mount, and Weldon shank. Obviously, should the mill instead be a face mill, then no shank exists as is well known in the art.

The tool body or head 12 is a substantially cylindrical body or shaft with a central axis CA, the shaft extending axially from the shank 14 to an end face 16 thereby defining an exterior surface 18 therebetween. The exterior surface 18 of the tool body 12 preferably includes a plurality of helical grooves. The overall perspective view in FIG. 1 shows two helical grooves 20 and 22, while the more detailed views of FIGS. 2–4 show a mill with four helical grooves 20, 22, 24 and 26 (the invention contemplates any number of two or more helical grooves). Each groove 20, 22, 24 and 26 is preferably cut into the exterior surface 18 in a helical or spiral manner that extends from the end face 16 to substantially the shank 14.

More specifically, each groove generally includes a pair of opposing faces, specifically a leading face 28 and a trailing face 30, defining a carved out flute area therebetween as best shown in FIGS. 1–4. The leading face 28 and trailing face 30 may either intersect at the radially most inward portion of the flute (thus defining a generally V-shaped radial cross section to the flute), or alternatively, as is best shown in FIG. 2, a base face 32 may connect the leading and trailing faces (thus defining a generally U-shaped cross section to the flute).

Each leading face 28 spirals cutting inward from the exterior surface 18 such that the face is approximately radial to the central axis of the substantially cylindrical shank 14 as shown in FIG. 1 when viewed from any given radial plane. Such spiraling may be either clockwise or counterclockwise. In contrast, each trailing face 30 is actually a plurality of stepped seats 34 where each seat includes a seat face 36.

An insert 38 is affixed to each seat face 36 in each groove 20, 22, 24 and 26. In the displayed embodiment, this is performed using a screw 39 with a tapered head insertable through a correspondingly tapered hole (not shown) in each insert and then threaded into a threaded hole in the respective seat face 36. It is within the scope of the invention that any known insert securing method and device may be used including all those well recognized in the art without altering the invention.

In this invention, all of the inserts used in each of the grooves or flutes 20, 22, 24 and 26 are identical. The inserts may generally be of any known construction, size, shape, or configuration so long as the inserts securely and properly fit the seat faces 36 in the intended manner. Examples of such inserts include those inserts described on pages 7–132 in the above referenced Kennametal Milling catalog. Specific examples include the ADKT or LFEW style inserts described therein.

These seat faces 36 and the inserts 38 thereon are positioned and stepped such that the inserts may or may not circumferentially overlap. In the embodiments shown, the inserts do slightly overlap. However, it is clearly within the invention and fitting of the objectives to separate the inserts circumferentially.

Figure 5:
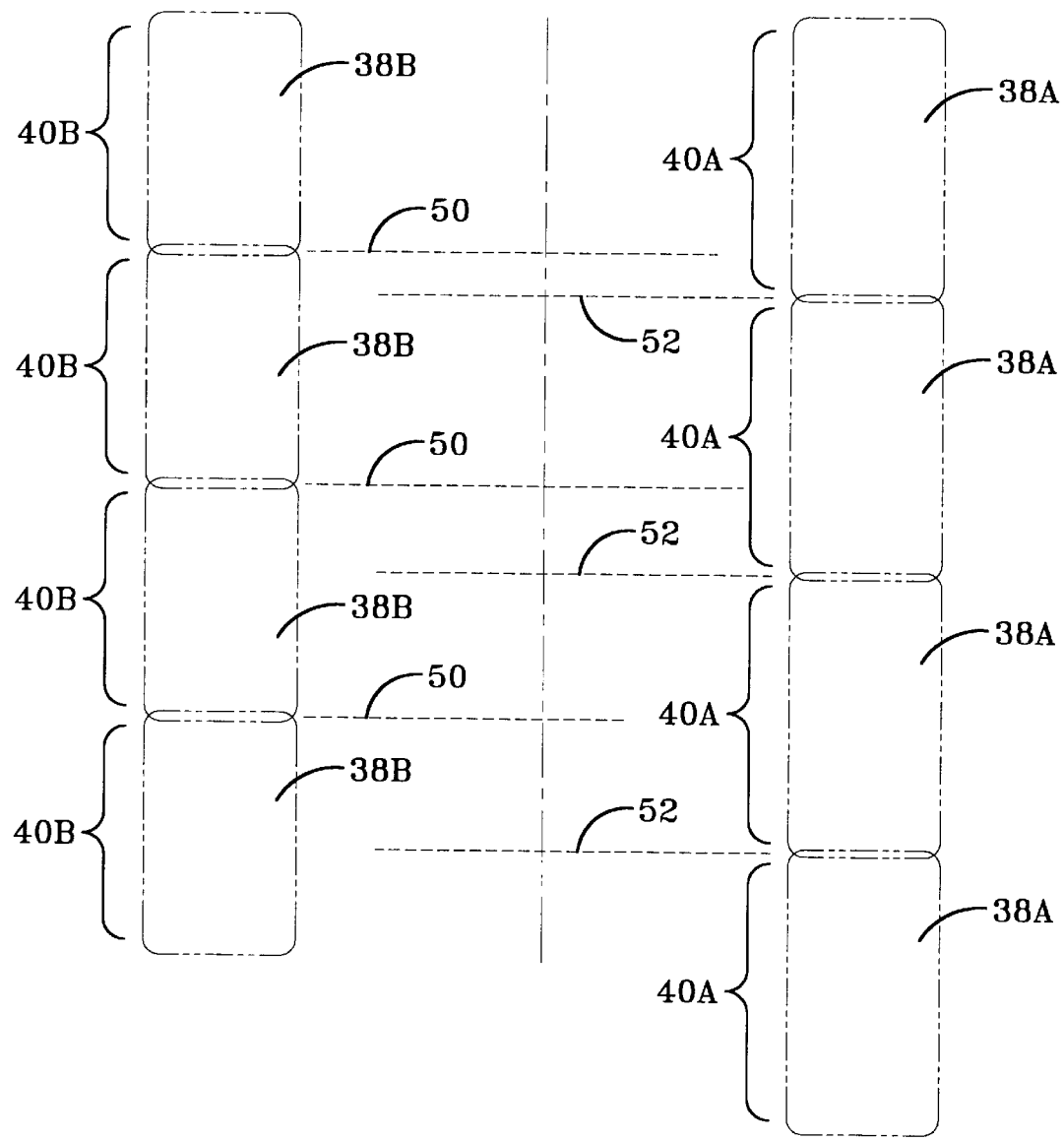
FIG. 5 is a two dimensional projection of the top faces of the inserts taken from the helical first and second flutes to show how the differing axial rake angle of the two flutes results in a differing effective axial length of the inserts in each flute.

Each insert 38 includes at least one cutting edge 40 as shown in FIGS. 3–5. Because of the nature of the invention and the varying axial rake faces providing "all effective" cutting as described in detail below, the cutting edges 40 of adjacent inserts need not overlap although the actual inserts may or may not. This is best shown in FIG. 5 where the cutting edges 40A and 40B of the embodiment shown do not overlap although the inserts do. This is a result of rounded corners on the cutting face where the corners are not part of the cutting edge because these corners do not engage the work surface and instead provide a smooth transition rather than a sharp edge producing transition between inserts. It is however contemplated by the invention that the actual cutting edges could also overlap and as such this is part of the invention.

These seat faces 36 each include a radial rake angle and an axial rake angle. The radial rake angle is the angle between the seat face 36 and the work surface. It is the radial tilt of the seat face 36 or the insert seated thereon when viewed from an outer cutting edge to inner edge and center axis perspective. With respect to this invention, the inventive features work regardless of the angle of the radial rake.

The axial rake angle is the axial tilt of the seat face 36 and/or the insert seated thereon in an end-to-end manner. This axial rake is best shown in FIGS. 3–4. More particularly, the axial rake angle is the angle between the center axis of the tool body 10 and any plane parallel to the cutting edge of the insert seated in the seat face 36. It is this axial rake angle that is critical to the present invention.

Figure 7:
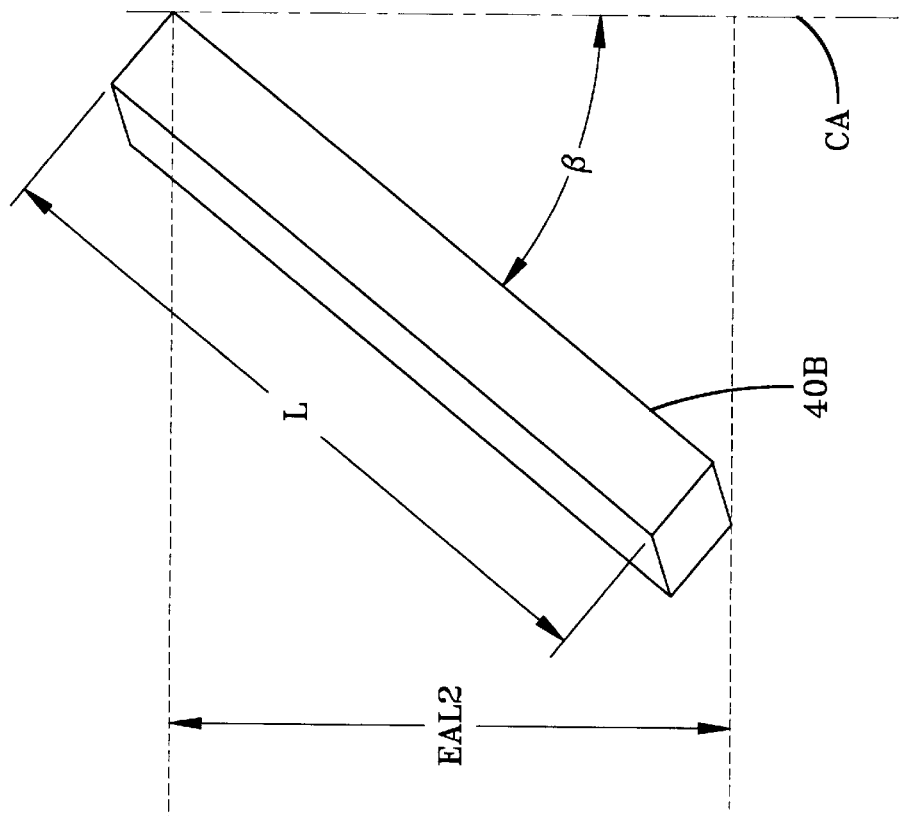
FIG. 7 is a fragmentary view of another insert from the second flute showing its effective axial length based upon its axial rake angle which differs from the insert in FIG. 6.
Figure 6:
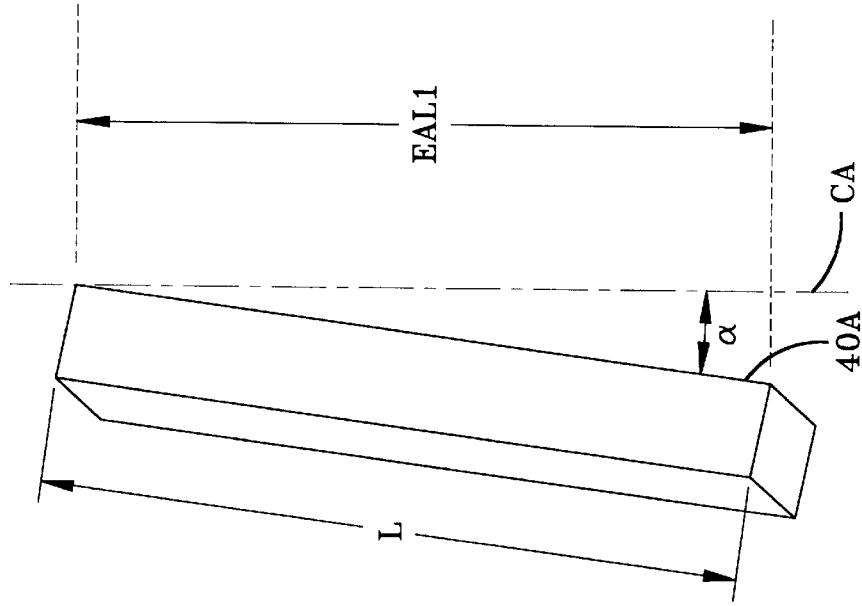
FIG. 6 is a fragmentary view of one insert from the first flute showing its effective axial length based upon its axial rake face.

In accordance with the main feature of this invention, the axial rake angle $\alpha$ of the seat faces 36 in helical groove 20, or grooves 20 and 24, are different than the axial rake angle $\beta$ of the seat faces in helical groove 22, or grooves 22 and 26. This is best shown by comparing FIGS. 3 and 4. As a result, the effective axial length EAL1 of the inserts in grooves 20 and 24, as shown in FIGS. 2 and 6, is longer than the effective axial length EAL2 of the inserts in the groove 22 and 26, as shown in FIGS. 3 and 7, although the insert dimensions including overall length L are identical. In effect, the calculation of this effective axial length is a geometric calculation where the effective axial length of the insert is one side of the triangle, the actual insert length is the longest side of the triangle, and the axial rake angle is the inclusive angle therebetween.

If these effective axial lengths, which are approximate the actual cutting length of each insert, are projected into a two dimensional view, they appear as shown in FIG. 5. The net result of the two differing axial rake angles is clearly shown as the inserts 38A of the flutes 20 and 24 have a longer effective axial length EAL1 than the inserts 38A of the flutes 22 and 26 and its effective axial length EAL2. The differing axial rakes equate to differing circumferential cutting lengths as shown by the differences between 40A and 40B. The use of these two flutes with inserts positioned at different axial rakes is an "all effective" cutting because the ridges, peaks, or other undulations caused by the cutting edges of adjacent inserts not overlapping are milled away by the inserts in the adjacent flute that are not aligned in cross section due to the differing axial rakes.

The actual angles of $\alpha$ and $\beta$ may be any angles between 0° and 90° so long as the inserts in adjacent flutes do not terminate in the same cross sections. This is best shown in FIG. 5 by lines 50 and 52 whereby the benefits of this invention are achieved so long as lines 50 and 52 do not overlap.

The angles are preferably between 1° and 30° and one example is α=7° and β=17°. In this specific example, the insert at an axial rake of 7° has an effective axial length, EAL1, of 0.9563 of its actual length L, and the insert at an axial rake of 17° has an effective axial length, EAL2, of 0.9925 of its actual length L.

Alternatively, the inserts in flutes 20 and 24, and in flutes 22 and 26, could be differently designed such that the seats 36 on the mill are identical, while the inserts provide for the differing axial rake angles. The invention only requires different axial rake at the cutting edge so the supplying of this axial rake may be based on the seat angle, the insert design, or both. If it is provided by the insert, the insert would then be thicker at one end with a smooth thickness transition to a thinner end.

In sum, the multiple flute end mill 10 provides for "all effective" milling regardless of overlap of cutting edges or actual insert bodies in a given flute. This is accomplished using inserts of identical design and dimension on the entire mill. The inventive feature is the varying of the axial rake angles between flutes which, in effect, varies the effective axial length of the inserts. By providing flutes with inserts thereon of differing axial lengths, the inserts are staggered and prove "all effective" cutting.

As previously indicated, the inventive feature of the invention of differing rake angles in the flutes is applicable to helical end mills, as shown in the figures, as well as face mills and other mills. It is also applicable to tool bodies other than cylindrical tool bodies, such as conical tool bodies.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A cutting tool comprising: a tool body with a central axis therein and an outer surface thereon, the tool body including at least a first and second spiraling flute in the outer surface, each spiraling flute including a plurality of inserts secured therein, and wherein the inserts in the first flute are each secured at a first axial rake angle while the inserts in the second flute are each secured at a second axial rake angle different from the first axial rake angle, wherein the inserts each have a cutting edge and the cutting edges on adjacent inserts in any flute do not circumferentially overlap, and wherein each insert has an actual length longer than the cutting edge, and the actual lengths of adjacent inserts in any flute circumferentially overlap.

2. The cutting tool of claim 1 wherein all of the inserts on the entire tool body are identical.

3. The cutting tool of claim 1 wherein the tool body includes four spiraling flutes, at least one of which has a first axial rake angle and at least another of which has a second axial rake angle.

4. The cutting tool of claim 1 wherein all of the inserts on the entire tool body are identical.

5. The cutting tool of claim 4 wherein each insert has an actual length longer than the cutting edge, and the actual lengths of adjacent inserts in any flute do not circumferentially overlap.

6. The cutting tool of claim 1 wherein the inserts each have a cutting edge and the cutting edges on adjacent inserts in any flute do not circumferentially overlap such that cutting using the cutting tool having at least two flutes with differing axial rake angles results in an all effective cut.

7. The cutting tool of claim 1 wherein the inserts each have a cutting edge and the cutting edges on inserts with differing axial rake angles have differing cutting edge lengths.

8. A cutting tool comprising: a tool body with a central axis therein and an outer surface thereon, the tool body including at least a first and second spiraling flute in the outer surface, each spiraling flute including a plurality of inserts secured therein, the inserts in all of the flutes being identical, and wherein the inserts in the first flute are secured so as to be of a first effective axial length while the inserts in the second flute are secured so as to be of a second effective axial length different from the first effective axial length, the inserts each have a cutting edge and the cutting edges on adjacent inserts in any flute do not circumferentially overlap, wherein each insert has an actual length longer than the cutting edge, and the actual lengths of adjacent inserts in any flute circumferentially overlap.

9. The cutting tool of claim 8 wherein the inserts in the first flute are each secured at a first axial rake angle while the inserts in the second flute are each secured at a second axial rake angle different from the first axial rake angle.

10. The cutting tool of claim 8 wherein all of the inserts on the entire tool body are identical.

11. The cutting tool of claim 8 wherein the tool body includes four spiraling flutes, two of which have a first axial rake angle and two of which have a second axial rake angle.

12. The cutting tool of claim 8 wherein all of the inserts on the entire tool body are identical.

13. The cutting tool of claim 12 wherein each insert has an actual length longer than the cutting edge, and the actual lengths of adjacent inserts in any flute do not circumferentially overlap.

14. The cutting tool of claim 8 wherein the inserts each have a cutting edge and the cutting edges on adjacent inserts in any flute do not circumferentially overlap such that cutting using the cutting tool having inserts with differing effective axial lengths results in an all effective cut.

15. A cutting tool comprising:

a tool body with a central axis therein and an outer surface thereon, the tool body including at least a first and second spiraling flute in the outer surface, each spiraling flute including a plurality of inserts secured therein, and wherein a cutting edge on each insert in the first flute is at a first axial rake angle while a cutting edge on each insert in the second flute is at a second axial rake angle different from the first axial rake angle, the inserts each have a cutting edge and the cutting edges on adjacent inserts in any flute do not circumferentially overlap wherein each insert has an actual length longer than the cutting edge, and the actual lengths of adjacent inserts in any flute circumferentially overlap.

\* \* \* \* \*